US011329992B2

(12) United States Patent
Chen et al.

(10) Patent No.: US 11,329,992 B2
(45) Date of Patent: May 10, 2022

(54) SECURITY MEASURES FOR EXTENDED SESSIONS

(71) Applicant: Shape Security, Inc., Santa Clara, CA (US)

(72) Inventors: Mengmeng Chen, Mountain View, CA (US); Sumit Agarwal, Palo Alto, CA (US); Yao Zhou, Fremont, CA (US)

(73) Assignee: F5, Inc., Seattle, WA (US)

( * ) Notice: Subject to any disclaimer, the term of this patent is extended or adjusted under 35 U.S.C. 154(b) by 104 days.

(21) Appl. No.: 16/654,513

(22) Filed: Oct. 16, 2019

(65) Prior Publication Data

US 2021/0120010 A1 Apr. 22, 2021

(51) Int. Cl.
*H04L 67/146* (2022.01)
*H04L 67/01* (2022.01)
*H04L 29/06* (2006.01)

(52) U.S. Cl.
CPC ............ *H04L 63/108* (2013.01); *H04L 63/08* (2013.01); *H04L 67/146* (2013.01); *H04L 67/42* (2013.01)

(58) Field of Classification Search
None
See application file for complete search history.

(56) References Cited

U.S. PATENT DOCUMENTS

| 10,931,686 | B1* | 2/2021 | Mehta | H04L 63/1416 |
| 2002/0065802 | A1* | 5/2002 | Uchiyama | G06F 16/9535 |
| 2006/0282660 | A1* | 12/2006 | Varghese | G06Q 20/4016 713/155 |
| 2016/0080367 | A1* | 3/2016 | Roth | H04L 63/20 726/9 |
| 2019/0222582 | A1* | 7/2019 | Laursen | H04L 63/108 |

* cited by examiner

Primary Examiner — Kevin T Bates
Assistant Examiner — Emad Siddiqi
(74) Attorney, Agent, or Firm — Troutman Pepper Hamilton Sanders LLP (Rochester)

(57) ABSTRACT

Techniques are provided for security measures for extended sessions. Request data for a request is received from a client computing device to a web server system. The request comprises a session identifier (ID) for a session between an authenticated user and the web server system. It is determined, based on the request data, that the client computing device is a single-user device. It is determined, based on the request data, that the client computing device is not compromised. In response to determining that the client computing device is a single-user device and that the client computing device is not compromised, extension of the session between the authenticated user on the client computing device and the web server system is caused.

16 Claims, 7 Drawing Sheets

| DEVICE ID | USER ID/S |
|---|---|
| 23452897 | UID1 |
| 34829521 | UID2, UID3, UID4 |
| 00765489 | UID5 |

UID DATA 302

FIG. 3A

ENC(UID2), ENC(UID3), ENC(UID4)

DEVICE UID DATA 306

COOKIE 304

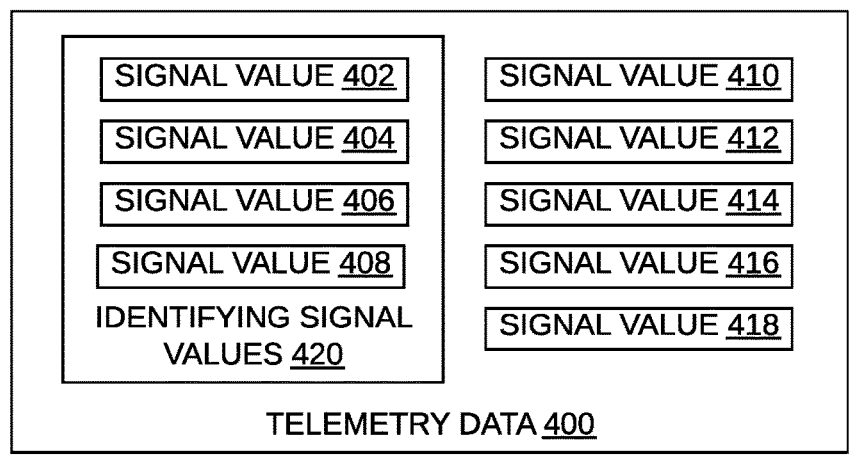

SIGNAL VALUE 402
SIGNAL VALUE 404
SIGNAL VALUE 406
SIGNAL VALUE 408
IDENTIFYING SIGNAL VALUES 420
SIGNAL VALUE 410
SIGNAL VALUE 412
SIGNAL VALUE 414
SIGNAL VALUE 416
SIGNAL VALUE 418
TELEMETRY DATA 400

FIG. 4B

Request 1: UID1 on Client Device A to X
Request 2: UID2 on Client Device B to X
Request 3: UID3 on Client Device A to X
Request 4: UID2 on Client Device B to X

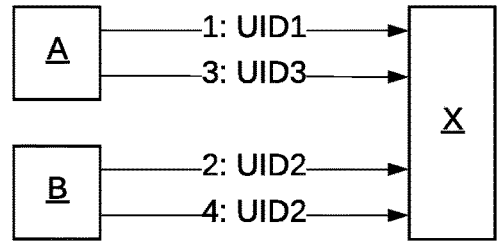

1: UID1
3: UID3
2: UID2
4: UID2

[ 402, 404, 406, 408, 410, 412, 414, 416, 418 ]

IDSD1 ← [ a, b, 462 c, d, e, f, g, h, i ]
TELEMETRY DATA 452 (Request 1)

IDSD2 ← [ a, j, 464 k, l, e, m, g, n, i ]
TELEMETRY DATA 454 (Request 2)

IDSD1 ← [ a, b, 466 c, d, e, o, g, h, p ]
TELEMETRY DATA 456 (Request 3)

IDSD2 ← [ a, j, 468 k, l, e, m, g, n, i ]
TELEMETRY DATA 458 (Request 4)

| DEVICE ID | USER ID/S |
|---|---|
| IDSD1 | UID1, UID3 |
| IDSD2 | UID2 |

SECURITY MEASURES FOR EXTENDED SESSIONS

FIELD OF THE DISCLOSURE

The present disclosure generally relates to security techniques applicable to client-server systems, and relates more specifically to security measures for extended sessions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Web server systems often manage and store user data. For example, a web server system may maintain data for one or more user accounts. The user data may include personal data that relates to an identifiable individual, private data that a user can reasonably expect to be secured from public view, or other sensitive user data that is protected by one or more agreements, regulations, laws, or other frameworks. These frameworks may also require that the web server system secures the user data from unauthorized access. For example, attackers may use automated software that obtains and/or uses user data, such as to carry out unauthorized acts, unauthorized transactions such as financial transactions, crimes targeting the web server system, crimes targeting a user, and/or computer fraud.

User accounts, including user data, are often protected by authentication. For example, a user may be asked to enter login credentials to access a user account at a web server system. The web server system may cause a user's computing device to cache session tokens and other security-related data at a so that the user does not have to continuously enter her login credentials each time the user sends a request to the web server system. Typically, a web server system that aggressively prevents unauthorized account access will define very short sessions for its users. Using shorter sessions may prevent an attacker from accessing an account if a user forgets to log out of a shared or public computer. However, short sessions force users to login more frequently, which causes additional friction between the web server system and the user.

SUMMARY

The appended claims may serve as a summary of the invention.

BRIEF DESCRIPTION OF THE DRAWINGS

In the drawings:

FIG. 3A illustrates UID data maintained by a security server system for implementing security measures in an example embodiment;

FIG. 3B illustrates encrypted UID data in a cookie in an example embodiment;

FIG. 4A illustrates telemetry data in an example embodiment;

FIG. 4B illustrates telemetry data and IDSD for a set of interactions in an example embodiment;

FIG. 4C illustrates UID data in an example embodiment;

Figure 1:
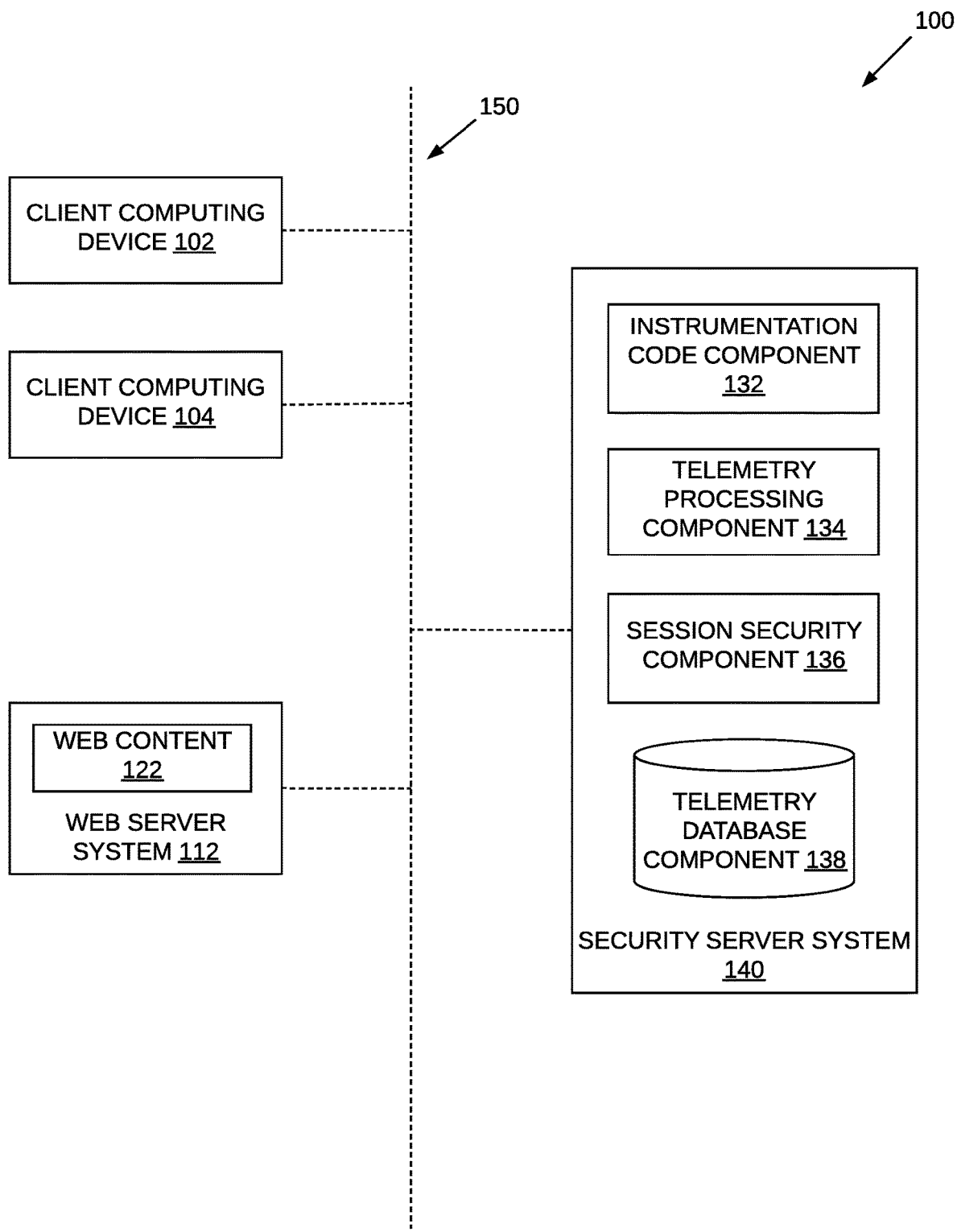
FIG. 1 illustrates a computer system that includes a security server system in an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other and does not imply an ordering, timing, or any other characteristic of the referenced items unless otherwise specified; the terms "such as", "e.g.", for example", and the like describe one or more examples but are not limited to the described example/s; the terms "comprises" and/or "comprising" specify the presence of stated features, but do not preclude the presence or addition of one or more other features.

A "computer system" refers to one or more computers, such as one or more physical computers, virtual computers, and/or computing devices. As an example, a computer system may be, or may include, one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to a "computer system" herein may mean one or more computers, unless expressly stated otherwise. When a computer system performs an action, the action is performed by one or more computers of the computer system.

A "client" refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers.

A "server" (also referred to as "server system" or "server computer system") refers to a combination of integrated software components and an allocation of computational resources, such as memory, a computing device, and processes on the computing device for executing the integrated software components. The combination of the software and computational resources provide a particular type of function on behalf of clients of the server. A server may refer to either the combination of components on one or more computers, or the one or more computers. A server may include multiple servers; that is, a server may include a first server computing device and a second server computing device, which may provide the same or different functionality to the same or different set of clients.

General Overview

This document generally describes systems, methods, devices, and other techniques for security measures for extended sessions. An entity that operates a web server system may wish to extend sessions for users, such as to reduce user friction and/or to increase the likelihood that a user chooses its services. Sessions are extended for authenticated users based on collected telemetry data. The collected telemetry data is used to ensure one or more security factors are met. The security factors may include determining, based on the telemetry data, that the authenticated user is using a client computing device that is single-user device with respect to a particular web server system. The security factors may also include determining, based on the telemetry data, that the client computing device is not compromised.

In some embodiments, a computer system receives request data is received for a request from a client computing device to a web server system. The computer system determines, based on the request data, that the client computing device is a single-user device and/or that the client computing device is not compromised. In response to determining that the client computing device is a single-user device and that the client computing device is not compromised, the computer system causes extension of the session between the authenticated user on the client computing device and the web server system.

In some embodiments, a security server system performs security measures for extended sessions for one or more web server systems. The security server system may be separate from the web server system. Alternatively and/or in addition, the security measures may be performed by a security server system that is implemented partially or fully within the web server system. A security server system may process personal data for a particular web server system in accordance with one or more agreements, regulations, laws, or other frameworks.

The various techniques described herein may achieve one or more of the following advantages: a web content provider may reduce user friction for legitimate users; in particular, the web content provider may reduce negative impacts caused by increased user friction such as decreased usage and/or incomplete transactions; the web content provider may better protect its users and itself from fraudsters; such features may be provided relatively simply for the web content providers in certain implementations; in particular implementations, such features can be added with minimal modification by the web content provider to hardware or software on its own server systems; security code and/or systems can be provided flexibly by an organization that specializes in web security, which can in turn keep the security code updated to address ever-changing security threats; such a security organization can also aggregate data received across many entities that operate many domains, including telemetry data and/or analyzed telemetry data; such a security organization can use such aggregated data to generate countermeasures that are more effective than countermeasures that could be developed using only data from a single domain. Additional features and advantages are apparent from the specification and the drawings.

System Overview

FIG. 1 illustrates a computer system that includes a security server system in an example embodiment. A computer system 100 includes at least one web server system 112, a plurality of client computing devices 102-104, and a security server system 140. The client computing devices 102-104, web server system 112 and security server system 140 communicate over one or more networks 150. The network/s 150 may include one or more local area networks (LANs) and/or one or more wide area networks, such as the Internet. The network arrangement and connectivity between the client computing devices 102-104, the web server system 112 and the security server system 140 may vary. Example arrangements are described in greater detail hereinafter.

The web server system 112 hosts web content 122, making the web content 122 available to one or more of the client computing devices 102-104. For example, the web content 122 may include one or more web pages, images, audio, video, messages, files, data, scripts, services, application content, and other content available over the network/s 150. In some embodiments, the web content 122 includes any data, instructions, or other content provided by the web server system 112 over the Internet, such as one or more responses to requests from the client computing devices 102-104. Some examples and/or embodiments are described with respect to a client computing device (e.g. client computing 102), which, unless otherwise specified, may apply to another client computing device (e.g. client computing device 104).

The web server system 112 may maintain user accounts for one or more users of the web server system 112. A user account may be associated with data, including private and/or personal data for the corresponding user. A particular user may access their account at the web server system 112 through authentication, such as by providing a username and password or other credentials so that the web server system 112 can verify the user's identity.

Security Server System

The security server system 140 implements security measures for extended sessions between the web server system 112 and one or more client computing devices 102-104. In some embodiments, the security server system 140 receives request data for a request from a client computing device 102 to a web server system 112. The request data may include the request, portions of the request, and/or other data relating to the request.

In some embodiments, the request and/or request data includes a session identifier (ID) for a session between an authenticated user using a particular client computing device 102 and the web server system 112. As used herein, the term "authenticated user" refers to a user that has successfully authenticated to the web server system 112, such as by logging in to the web server system 112 using a username and password, and/or other means of authentication such as but not limited to hardware tokens, biometric authentication, social authentication, two-factor authentication, and/or other forms of authentication. The security server system 140 may determine, based on the request data, that security criteria are met for extending the session between the authenticated user on the client computing device 102 and the web server system 112.

In some embodiments, the security server system 140 includes an instrumentation code component 132, a telemetry processing component 134, a session security component 136, and a telemetry database component 138. The security server system 140 and/or its components (e.g. instrumentation code component 132, telemetry processing component 134, session security component 136, and/or telemetry database component 138) are presented herein as individual components for ease of explanation; any action performed by or to one or more components of the security server system 140 may be considered performed by or to the security server system 140. The security server system 140 and/or its components may be implemented as one or more dependent or independent processes, and may be implemented on one or multiple computers; for example, a component may be implemented as a distributed system; alternatively and/or in addition, multiple instances of one or more components may be implemented. Furthermore, a component shown may be implemented fully and/or partially in one or multiple programs and/or processes, and two or more components shown may be implemented fully and/or partially in the same program and/or process. The security server system 140 may be implemented partially or fully within a web server system 112, or may be separate from the web server system 112.

Single-User Device

The security server system 140 may consider whether the client computing device 102 is a single-user device when determining whether to extend a session between an authenticated user on the client computing device 102 and the web server system 112. A client computing device 102 is a single-user device if only one authenticated user has logged in to the web server system 112 during a time period. Given that the session is between an authenticated user and the web server system 112, the client computing device 102 is a single-user device when only the authenticated user has logged in to the web server system 112 during the time period.

The time period may include a period that a security server system 140 has been monitoring interactions between client computing devices 102-104 and the web server system 112. In some embodiments, the time period may include a particular amount of time, such as the most recent year or a most recent number of days. The security server system 140 may determine that the risk for extending the session is low based at least in part on determining that the client computing device is a single user device. The particular amount of time may be indefinite, based on the amount of time a session is valid, or chosen by personnel operating the web server system 112 or the security server system 140.

If more than one authenticated user has logged in to a web server system 112 from a particular client computing device 102 during the time period, then the particular client computing device 102 is not a single-user device. In some embodiments, the client computing device 102 is classified in another category based at least in part on the number of authenticated users that have logged in during the time period. For example, a client computing device 102 may be classified as a shared device, a public device, or another device category based on the number of authenticated users that have logged in to the web server system 112 from the client computing device 102 during the time period.

In some embodiments, when determining whether to extend a session with a particular web server system 112, the security server system 140 considers authenticated users that have logged in to the particular web server system 112 from a client computing device among the client computing device 102. Alternatively and/or in addition, the security server system 140 may consider authenticated users that have logged in to one or more other web server systems 112 from the client computing device 102. For example, when the security server system 140 monitors a plurality of web server systems 112, the security server system 140 may determine whether two or more users have used a particular client computing device 102 to access any monitored web server system 112.

The security server system 140 may have a flexible definition of single-user device when implementing security measures for session extension. For example, when protecting different web server systems 112, the security server system 140 may use the same or different set of web server systems 112, time periods, or other parameters when determining whether a client computing device is a single-user device.

Compromised Device

The security server system 140 may consider whether a client computing device 102 is a compromised device when determining whether to extend a session between an authenticated user on the client computing device 102 and the web server system 112. For example, the security server system 140 may find indicia of compromise when evaluating telemetry data collected at the client computing device 102. An indicia of compromise indicates a security risk associated with the client computing device 102.

Example indicia of compromise include detection of non-human behavior at the client computing device 102, detection of software controlling the client computing device 102, determining that an IP, ASN, or other information associated with the client computing device 102 is associated with non-human behavior or attacks, and/or detecting other features indicating that a client computing device 102 may be compromised. For example, the security server system 140 may determine that a client computing device 102 is compromised when the security server system 140 determines that the client computing device is controlled by automated software. In some embodiments, the indicia of compromise include determining whether one or more tokens, cookies, or other browser data submitted in association with a request have been tampered with at the client computing device 102.

In some embodiments, when the security server system 140 receives request data for a request from a client computing device 102 to a web server system 112, the security server system 140 may provide instrumentation code that collects telemetry data at the client computing device 102 when the instrumentation code is executed at the client computing device, receive the telemetry data collected at the client computing device 102, and analyzing the telemetry data to determine whether the client computing device 102 is compromised before extending the session in response to the request. For example, the security server system 140 may evaluate telemetry data collected at the client computing device 102 to determine whether a legitimate human user is attempting to access the authenticated user's account at the web server system 112.

In some embodiments, the security server system 140 uses prior telemetry data collected at the client computing device 102 to determine whether the client computing device 102 is compromised when determining whether to extend the session in response to the request. For example, the security server system 140 may have previously set a security cookie at the client computing device 102 after analyzing telemetry data collected in association with a prior interaction to determine that the client computing device 102 is not compromised. When processing the current request, the security server system 140 may determine that that the client computing device 102 is not compromised based on the presence of a valid security cookie.

Instrumentation Code

The security server system 140 may use instrumentation code to collect telemetry data at the client computing devices 102-104. The security server system 140 may use the collected telemetry data from a client computing device 102 to determine one or more security factors, such as whether a client computing device 102 is a single-user device and/or whether the client computing device 102 is compromised. For example, the instrumentation code component 132 may provide instrumentation code to collect telemetry data about particular signals at the client computing device 102. The particular signals may be analyzed to determine whether the client computing device 102 is a single-user device and/or to detect an indicia of compromise.

As used herein, the term "instrumentation code" refers to source code, bytecode, binary software, or other computer code that is executed on a computer to collect telemetry data at the computer. For example, instrumentation code may be JavaScript that collects and/or otherwise generates data on a client computing device 102, referred to herein as telemetry data. The instrumentation code may also include instructions to send the telemetry data to a server, such as the security server system 140 and/or the web server system 112. In some embodiments, the instrumentation code includes instructions to send collected telemetry data to a server over one or more requests. For example, the security server system 140 may receive the telemetry data directly from the client computing device 102 or indirectly via one or more other computers, such as the web server system 112.

In some embodiments, the instrumentation code component 132 provides instrumentation code to a client computing device 102 when the client computing device 102 interacts with a web server system 112. For example, the instrumentation code component 132 may provide instrumentation code for execution at a client computing device 102 when the client computing device 102 requests web content 122 from the web server system 112. In some embodiments, the interaction may include a user interacting with an application on the client computing device 102, such as a web application or a native application installed on a computer or a mobile device.

In some embodiments, the security server system 140 provides instrumentation code to collect telemetry data during one or more particular interaction types. For example, the instrumentation code component 132 may provide instrumentation code to client computing devices 102-104 when the client computing devices 102-104 request to log in to a web server system 112. The instrumentation code component 132 may provide instrumentation code for one or more specific transaction types, such as login transactions, other authentication transactions, purchase transactions, financial transactions, data submission, account creation, and/or other transaction types. An interaction for which the security server system 140 collects telemetry data using instrumentation code is also referred to herein as a monitored interaction.

In some embodiments, the instrumentation code component 132 provides different instrumentation code in different situations. For example, the instrumentation code component 132 may provide different instrumentation code to clients of different web server system 112. In some embodiments, the instrumentation code component 132 provides different instrumentation code for different client computing devices 102-104. For example, different instrumentation code may be provided when client computing devices 102-104 are running different browsers, operating systems, or other software (including different versions thereof), or when the security server system 140 determines that client computing devices 102-104 pose a different amount or type of security risk.

The instrumentation code may be provided in different formats. For example, the instrumentation code may include JavaScript code, and/or other web code that executes in a browser or other JavaScript engine at the client computing device 102. In some embodiments, the instrumentation code may include bytecode, such as JavaScript bytecode. The instrumentation code may be provided with web code requested by the client computing device 102. In some embodiments, the instrumentation code may be obfuscated to prevent an attacker from understanding the instrumentation code, and/or integrated with the web code to prevent execution of the web code without execution of the instrumentation code.

In some embodiments, at least a portion of the instrumentation code is provided in an application installed at the client computing device 102 by providing a Software Development Kit (SDK) to a developer of the application. When the application at the client computing device 102-104 interacts with the application server of the web server system 112-116, the application may interact with the instrumentation code component 132, such as by sending telemetry data and/or obtaining additional instrumentation code for execution at the client computing device 102.

Telemetry Data

The telemetry processing component 134 receives and processes telemetry data collected at the client computing devices 102-104. In some embodiments, the telemetry processing component 134 maintains a telemetry data set that includes telemetry data collected for a plurality of interactions between client computing devices 102-104 and web server system 112. For example, the telemetry processing component 134 may store the telemetry data set in a telemetry database component 138 that is accessible to other components of the security server system 140 to implement security measures for extended sessions.

The instrumentation code may collect telemetry data about particular signals at one or more client computing devices 102-104. As used herein, the term "signal" refers to a specific type of data to collect at a client computing device 102, such as a particular property and/or aspect of: a computing environment at the client computing device 102, one or more operating states of the client computing device 102, one or more operations performed at the client computing device 102, user interaction at the client computing device 102, and/or other properties and/or aspects the client computing device 102. As used herein, the term "signal value" refers to a value for a signal (e.g. the specific type of data) at a client computing device 102, as detected by the instrumentation code. For example, a signal may be an IP address, while a signal value collected at the client computing device 102 is the IP address of the client computing device 102 (e.g. 123.456.78.9). Other signals may include network properties, operating system properties, browser properties, installed software properties, display size, other hardware properties, device configuration properties, information about execution of web code or other web content, information about processing of web content, information about human or software interactions with the web content, information about user inputs at the client computing device 102, and other signals that are collectable when the instrumentation code is executed at the client computing device 102. In some embodiments, a different number of signals may be collected for different transactions.

Extending a Session

A session is a temporary and interactive information interchange between two or more communicating devices, such as a client computing device 102 and a web server system 112. A session is established at a certain point in time, and may be brought to an end at a later point in time. In session-based authentication, after a user on a client computing device 102 is authenticated, the web server system 112 provides a session identifier (ID). For example, the session ID may be stored in a cookie set by the web server system 112 at the client computing device 102. Alternatively, the techniques described herein may also be applied using a session token created by the web server system 112 and provided to the client computing device 102. Unless otherwise specified, the term "session ID", as used herein, refers to a session ID stored in a cookie, or another unique identifier for a session, including but not limited to a session token.

The client computing device 102 may attach the session ID to subsequent requests. For example, the client computing device 102 may send a session token or a cookie comprising the session ID with subsequent requests to the web server system 112. At end of the session, the web server system 112 destroys the session, such as by clearing a cookie at the client computing device 102, invalidating a session token, or otherwise rendering the session ID unusable by the client computing device 102 to continue a session involving the authenticated user. A session ID and/or cookie containing a session ID may have an expiration time. After the expiration time, the session ID is no longer usable to continue the session between the authenticated user on the client computing device 102 and the web server system 112.

Figure 2:
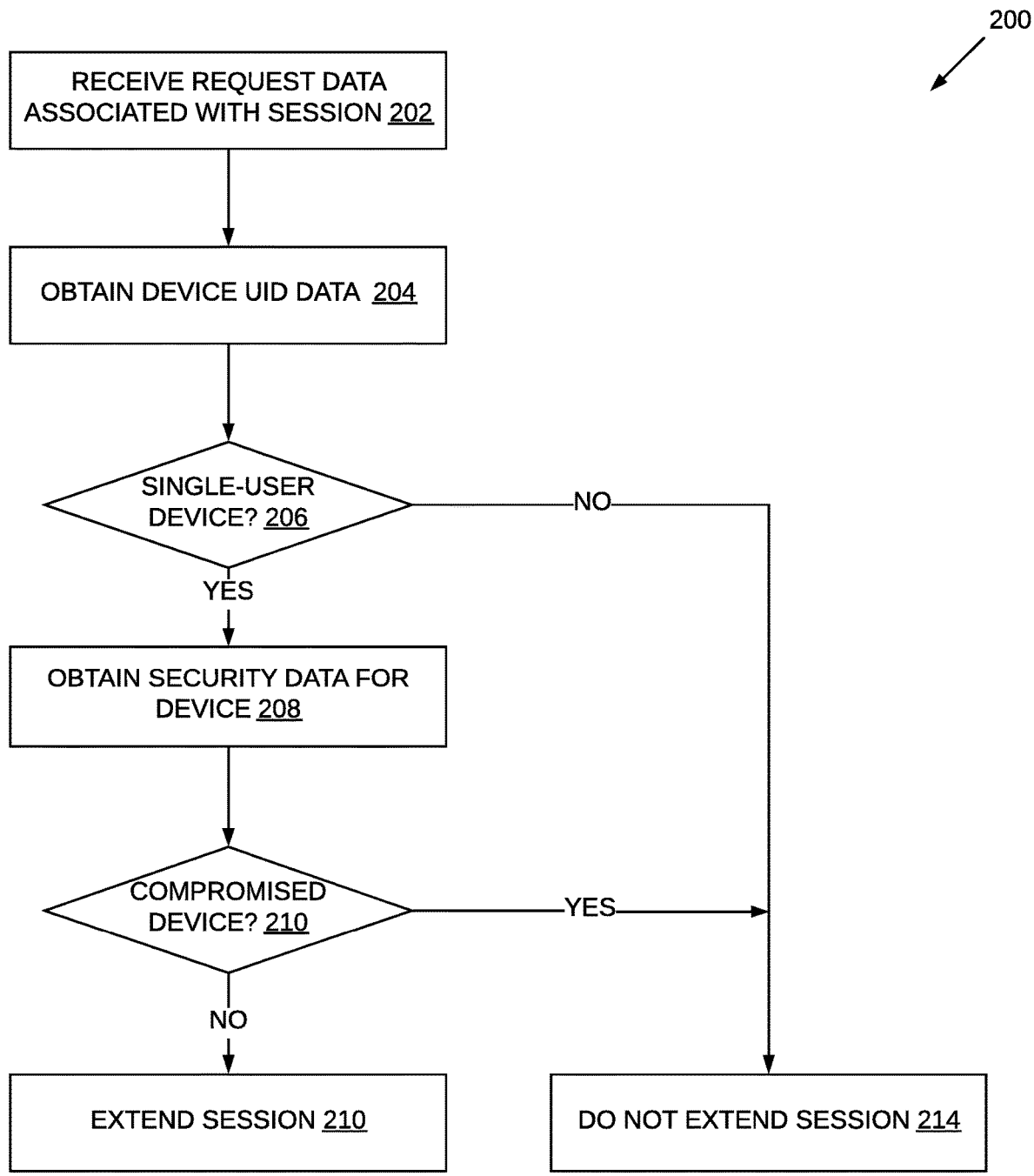
FIG. 2 is a flow diagram for implementing security measures for extended sessions in an example embodiment.

FIG. 2 is a flow diagram for implementing security measures for extended sessions in an example embodiment. Process 200 may be performed by one or more computing devices and/or processes thereof. In some embodiments, one or more blocks of process 200 are performed by a security server system (e.g. security server system 140). Process 200 will be described with respect to the security server system 140, a client computing device 102, and web server system 112, but is not limited to performance by such.

At block 202, the security server system 140 receives request data for a request from a client computing device 102 to a web server system 112. The request data may include a session identifier (ID) for a session between an authenticated user and the web server system 112.

At block 204, the security server system 140 obtains user identifier (UID) data, such as but not limited to one or more usernames, corresponding to one or more users that have used the client computing device 102. The UID data corresponds to one or more authenticated users that have successfully logged in or otherwise authenticated with the web server system 112 from the client computing device 102. Management and storage of UID data is described in greater detail hereinafter.

At decision block 206, the security server system 140 determines whether the client computing device 102 is a single-user device based at least in part on the UID data. If the client computing device 102 is not a single-user device, processing continues to block 214, where the security server system 140 does not extend a session. Otherwise, if the client computing device 102 is a single-user device, processing continues to block 208.

At block 208, the security server system 140 obtains security data for the client computing device 102. In some embodiments, the security data includes telemetry data collected at the client computing device 102. The telemetry data may be provided to the security server system 140 as part of the request data. For example, the telemetry data may be received with the request, as part of the request, or before the request.

At decision block 210, the security server system 140 determines whether the client computing device 102 is compromised. The security server system 140 may determine whether the client computing device 102 is compromised based on the telemetry data or other security data. If the client computing device 102 is compromised, processing continues to block 214, where it the security server system 140 does not extend a session. Otherwise, if the client computing device 102 is not compromised, processing continues to block 210.

At block 210, the security server system 140 causes the session between the authenticated user on the client computing device 102 and the web server system 112 to be extended. For example, the security server system 140 may provide an indication to the web server system 112 that the security server system 140 has determined that the session should be extended. In some embodiments, the security server system 140 provides an indication to the web server system 112 that the client computing device 102 is a single-user device, that the client computing device 102 is not compromised, and/or other determinations made by the security server system 140. The web server system 112 may extend the session based on receiving one or more indications from the security server system 140.

In some embodiments, the security server system 140 may implement an application programming interface (API) that allows the web server system 112 to make an API call regarding a particular client computing device 102. For example, the web server system 112 may use an API call to submit request data corresponding to a session, obtain a recommendation on whether the session should be extended, obtain information on whether a client computing device 102 is a single-user device, obtain information on whether a client computing device 102 is compromised, and/or other functionality implemented in the API.

In some embodiments, the security server system 140 receives a request on behalf of the web server system 112. The request may include telemetry data collected at the client computing device 102. After processing the request, the security server system 140 may decorate the request with a security value that indicates whether or not the web server system 112 should extend a current session with an authenticated user on the client computing device 102 without requiring the authenticated user to log in or otherwise reauthenticate. The security server system 140 may forward the decorated request to the web server system 112 for processing. When the web server system 112 processes the decorated request, the web server system 112 may extend the session.

In some embodiments, extension of a session includes issuing a new session cookie for the authenticated user at the client computing device with a new expiration date. Alternatively and/or in addition, extension of a session may include setting a new expiration date for an existing session cookie for the authenticated user at the client computing device. The session cookie may be set or modified by the web server system 112 and/or the security server system 140 in one or more embodiments.

Maintaining Stored User Id (UID) Data by the Security Server System

In some embodiments, the security server system (e.g. security server system 140) manages and stores UID data to use in determining whether a client computing device (e.g. client computing devices 102-104) is a single-user device. FIG. 3A illustrates UID data maintained by a security server system for implementing security measures in an example embodiment.

UID data 302 includes a device ID for each client computing device. For example, the security server system may assign a unique device ID to each unique client computing device. In some embodiments, a unique device ID is assigned to each user agent. A user agent is software executing on a client computing device, such as a browser, a web-enabled application, or other software and/or hardware that interacts with a web server system (e.g. web server system 112) monitored by the security server system. In some implementations, individual user agents operating on the same client computing device are treated as unique client computing devices. The UID data 302 includes device IDs and UIDs for one web server system or multiple web server systems monitored by the security server system.

In some embodiments, the security server system issues a cookie to the client computing device comprising the device ID. For example, the device ID may be included in a session cookie or another cookie. The client computing device submits the cookie and/or the device ID with a request. When the request is a login request for a particular user, the security server system may store a UID corresponding to the particular user in association with the device ID in the UID data 302. The UID stored in the UID data 302 may be the actual username for the user's account at the web server system, or another identifier that uniquely identifies the user. For example, a function, such as but not limited to a hash function, may be applied to the username to generate the UID.

UID data 302 includes device IDs for three different client computing devices. For a first client computing device that is assigned a device ID 23452897, the UID data 302 stores UID1, reflecting one authenticated user that successfully logged in to the web server system from the corresponding client computing device during a relevant time period that the security server system was monitoring the web server system. For a second client computing device that is assigned a device ID 34829521, the UID data 302 stores UID2, UID3, and UID4, reflecting three authenticated users that successfully logged in to the web server system from the corresponding client computing device. For a third client computing device that is assigned a device ID 00765489, the UID data 302 stores UID5, reflecting one authenticated user that successfully logged in to the web server system from the corresponding client computing device.

The security server system may determine whether a client computing device is a single-user device by using the device ID to look up the user ID data associated with the web server system. Based on the UID data 302, client computing device 23452897 and client computing device 00765489 are single-user devices.

The security server system may maintain and/or store UID data 302. For example, in FIG. 5, a security server system 540 stores UID data 536 for a particular web server system 512. When a successful user login occurs on a new client computing device that is not in the UID data 302, the security server system assigns a new device ID to the new client computing device and updates the UID data 302 to include the new device ID and the UID. When a successful login for a new user occurs on a client computing device that is in the UID data 302, a UID for the new user is added to the UID data 302 in association with the corresponding device ID.

Storing Encrypted User Id (Uid) Data in a Cookie

In some embodiments, encrypted UID data is stored in a cookie at the client computing device (e.g. client computing devices 102-104). The security server system (e.g. security server system 140) evaluates the encrypted UID data received from the client computing device to determine whether the client computing device is a single-user device.

FIG. 3B illustrates encrypted UID data in a cookie in an example embodiment. Device UID data 306 for a particular client computing device is stored in a cookie 304 set at the client computing device by the security server system or the web server system. The device UID data 306 may include one or more encrypted UIDs corresponding to one or more usernames and/or user accounts at the corresponding web server system (e.g. web server system 112). The cookie 304 may omit a device ID since the cookie 304 is set on a particular client computing device.

Cookie 304 is an example cookie set on the client computing device with the device ID 34829521 in FIG. 3A. Cookie 304 includes Device UID data 306 which includes encrypted versions of UID2, UID3, and UID4. The encrypted UIDs may be individually encrypted and/or encrypted as a group. In some embodiments, the cookie 304 is an encrypted cookie. In some embodiments, the cookie 304 may include device UID data 306 for a single web server system or multiple web server systems. In some embodiments, the cookie 304 includes a message authentication code (MAC) to verify that the cookie 304 has not been tampered with. The MAC may be generated by the security server system, such as by using a secret known to the security server system. The MAC verifies the authenticity of the cookie 304 as the cookie set for the particular client computing device that submit the cookie 304.

In some embodiments, the security server system issues a cookie to a client computing device that includes encrypted user ID data for each authenticated user that successfully logs in to the web server system from the client computing device. The cookie is included with a subsequent request from the client computing device. The security server system can determine whether the client computing device is a single-user device by analyzing the encrypted UIDs in the device UID data 306.

Identifying Signal Data (IDSD)

In some embodiments, a security server system (e.g. security server system 140) determines whether a client computing device (e.g. client computing devices 102-104) is a single-user device with respect to a web server system (e.g. web server system 112) by generating identifying signal data (IDSD) for a request from the client computing device to the web server system. An IDSD can be generated or otherwise determined based on telemetry data received from the client computing device involved in the request or other interaction.

FIG. 4A illustrates telemetry data in an example embodiment. The telemetry data 400 is generated at a client computing device (e.g. client computing devices 102-104) when instrumentation code provided by a security server system (e.g. security server system 140) is executed at the client computing device. The telemetry data 400 includes a plurality of signal values 402-418. Instrumentation code executing at a client computing device can collect signal values 402-418 for a set of specified signals. For example, the instrumentation code may collect a display size signal of the corresponding client computing device, and the reported signal value 402 for the display size signal may indicate dimensions of a display of the corresponding client computing device, such as 1440×4560 pixels.

The telemetry data 400 includes identifying signal values 420 for a set of one or more identifying signals. The identifying signals are selected such that the identifying signal values 420 are expected to uniquely identify the client computing device and/or a particular user on the client computing device corresponding to the telemetry data 400. The identifying signal values 420 include at least a subset of the signal values 402-418 in the telemetry data 400. For example, the identifying signal values 420 include four signal values 402-408. The telemetry data 400 may include other signal values 410-418 that are not included in the identifying signal values 420. In some embodiments, the telemetry data 400 may include only the identifying signal values 420.

The security server system generates identifying signal data (IDSD) corresponding to the interaction based on the corresponding telemetry data. The IDSD for an interaction may include one or more identifying signal values 420, one or more derived values that generated based on one or more identifying signal values 420, or a combination thereof. In some embodiments, the IDSD is the unprocessed identifying signal values 420 for the set of identifying signals. Alternatively and/or in addition, the IDSD may be determined by processing one or more of the identifying signal values 420. For example, a deterministic function, such as a hash or another function, may be applied to the identifying signal values 420 to generate the IDSD. In some embodiments, a telemetry database component (e.g. telemetry database component 138) stores processed IDSDs in the telemetry data set in association with the telemetry data.

The security server system may implement security measures for extended sessions using a set of identifying signals that is selected to distinguish different client computing devices with a high probability. That is, in some cases, a different client computing device may generate telemetry data with the same IDSD. The identifying signals may also be selected so that the IDSD distinguishes a characteristic other than the client computing device associated with the telemetry data. For example, the identifying signals may be selected to generate an IDSD that distinguishes a particular individual or user on the client computing device.

In some embodiments, the identifying signal values 420 are collected for identifying signals that are expected to be static and/or infrequently changing on the client computing device, such as a display size, an operating system type, and/or another static or infrequently changing signal. When an infrequently changing signal is used, a transaction by the same client computing device may have telemetry data that generates a different IDSD than a prior transaction. However, the change in IDSD is expected to happen infrequently, and the client computing device will develop a newer transaction history with the newer IDSD.

Using IDSD to Generate UID Data

In some embodiments, IDSD are used to identify client computing devices. For example, a security server system (e.g. security server system 140) may generate an IDSD for one or more interactions between a web server system (e.g. web server system 112) and a particular client computing device (e.g. client computing devices 102-104).

FIG. 4B illustrates telemetry data and IDSD for a set of interactions in an example embodiment. Telemetry data is shown for a set of interactions that include Requests 1-4. Request 1 occurs in an interaction between Client Device A and Web Server System X when a user UID1 is using Client Device A. Request 2 occurs in an interaction between Client Device B and Web Server System X when a user UID2 is using Client Device B. Request 3 occurs in an interaction between Client Device A and Web Server System X when a user UID3 is using Client Device A. Request 4 occurs in an interaction between Client Device B and Web Server System X when a user UID2 is using Client Device B.

Telemetry data 452-458 corresponds to Requests 1-4, respectively. Client Device A submitted telemetry data 452 in association with Request 1. Client Device B submitted telemetry data 454 in association with Request 2. Client Device A submitted telemetry data 456 in association with Request 3. Client Device B submitted telemetry data 458 in association with Request 4. The telemetry data 452-458 for Requests 1-4 each include identifying signal values 462-468.

Identifying signal values 462 and 466 are matching (a, b, c, d), indicating that telemetry data 452 and 456 were generated at the same client computing device (Client Device A). Identifying signal values 464 and 468 are matching (a, j, k, l), indicating that telemetry data 454 and 458 were generated at the same client computing device (Client Device B).

An IDSD corresponding to each of Requests 1-4 is generated based on the respective identifying signal values 462-468. For example, IDSD1 may simply be the set of corresponding identifying signal values (a, b, c, d), or may be a value calculated based on the set of corresponding identifying signal values. IDSD1 is generated based on identifying signal values 462 corresponding to Request 1. IDSD2 is generated based on identifying signal values 464 corresponding to Request 2. IDSD1 is generated based on identifying signal values 466 corresponding to Request 3. The IDSD for Request 3 is identical to the IDSD for Request 1 because telemetry data 452 and 456 were generated at the same client computing device (Client Device A), leading to matching identifying signal values 462 and 466. IDSD2 is generated based on identifying signal values 468 corresponding to Request 4. The IDSD for Request 4 is identical to the IDSD for Request 2 because telemetry data 454 and 458 were generated at the same client computing device (Client Device B), leading to matching identifying signal values 464 and 468.

FIG. 4C illustrates UID data in an example embodiment. The UID data 470 includes data describing one or more users that have interacted with Web Server System X from one or more client computing devices, Client Device A and Client Device B. The data describing one or more users may include a UID for each user, an encrypted UID for each user, multiple encrypted UIDs, or other data that uniquely identifies each user.

In some embodiments, when a security server system (e.g. security server system 140) obtains and processes telemetry data 452-458 for interactions between client computing devices and a web server system (e.g. web server system 112), the security server system makes any necessary updates to the UID data for the web server system. For example, a security server system may update the UID data 470 for Requests 1-4 from one or more client computing devices to Web Server System X. The UID data 470 indicates that users UID1 and UID3 have interacted with Web Server System X from Client Device A. The UID data 470 also indicates that users UID2 has interacted with Web Server System X from Client Device B.

The security server system may monitor particular interaction types, such as login requests and/or other requests related to user authentication. In some embodiments, the UID data 470 is updated to include data describing one or more users that have successfully logged into Web Server System X.

The IDSD generated for an interaction identifies the client computing device involved in the interaction. For example, IDSD1 is generated from telemetry data 452, indicating that Request 1 originates from a first client computing device (Client Device A); IDSD2 is generated from telemetry data 454, indicating that Request 2 originates from a second client computing device (Client Device B); IDSD1 is generated from telemetry data 456, indicating that Request 3 originates from the first client computing device (Client Device A); and IDSD2 is generated from telemetry data 458, indicating that Request 4 originates from the second client computing device (Client Device B).

When a new client computing device is encountered, the security server system may add data for the new client computing device to the UID data 470. For example, when processing Request 2 from Client Device B involving user UID2, the security server system may generate IDSD2, and determine that the UID data 470 does not include any data for a client computing device corresponding to IDSD2. If Request 2 corresponds to a successful login, the security server system may add UID2 in association with the Client Device B to the UID data 470.

The security server system may determine that a client computing device is a single-user device by determining that an authenticated user is the only user who has had an authenticated session with a web server system from a computing device associated with the IDSD. For example, Client Device 2 is a single-user device because IDSD2 is only associated with one UID in the UID data 470.

In some embodiments, the IDSD generated for an interaction based on corresponding telemetry data is used as a Device ID in the UID data 470. For example, in the UID data 470, the Device ID for Client Device A is IDSD1, and the Device ID for Client Device B is IDSD2, which are generated by the identifying signal data 462-468 from the telemetry data collected 452-458 collected from the respective client device.

Example System Architecture

Figure 5:
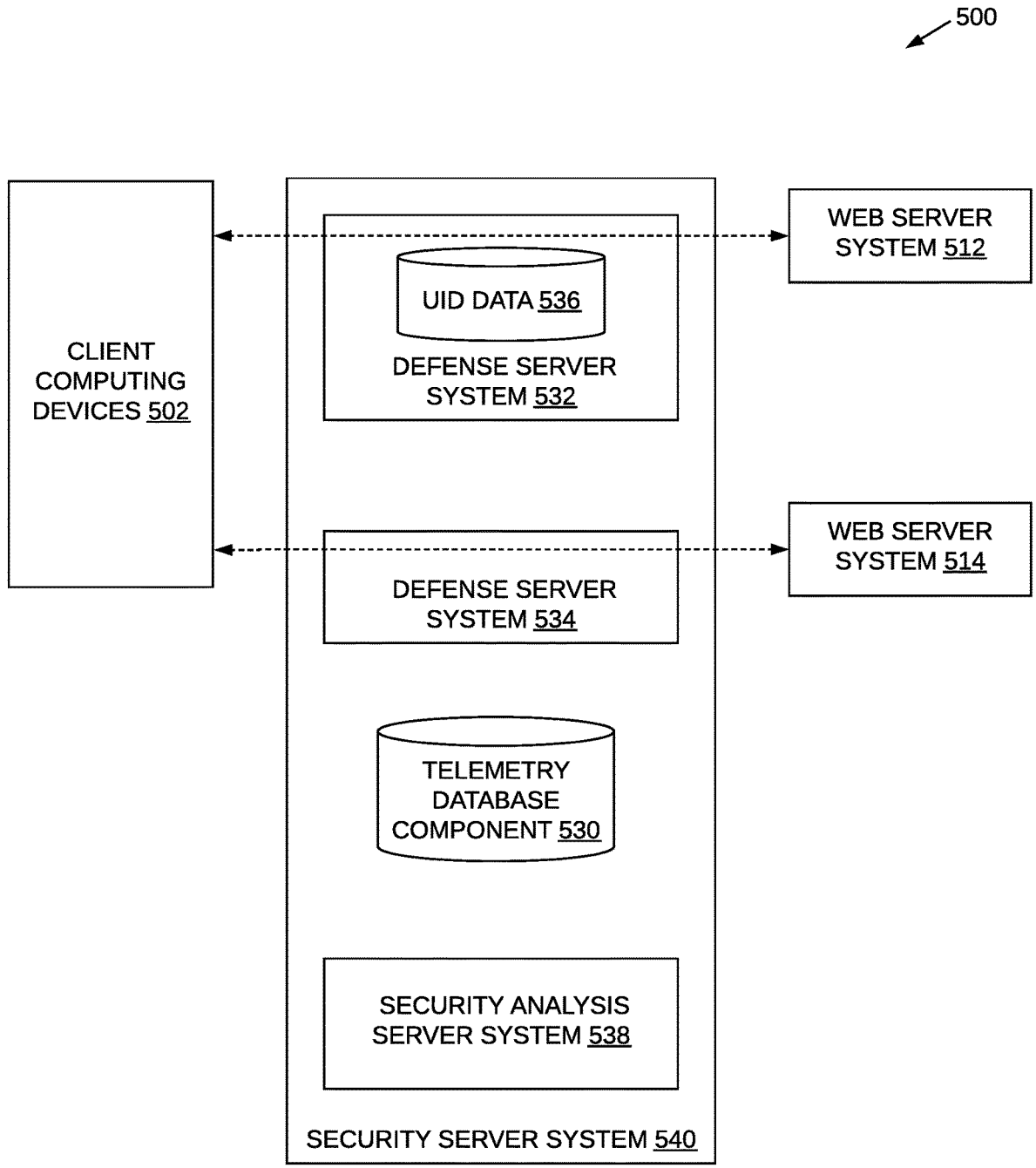
FIG. 5 illustrates a computer system including a security server system in an example embodiment.

A security server system (e.g. security server system 140) may include one or more server systems that provide instrumentation code to client computing devices (e.g. client computing devices 102-104) and process telemetry data received from the client computing devices when the instrumentation code executes on the client computing devices. FIG. 5 illustrates a computer system including a security server system in an example embodiment. The computer system 500 includes a security server system 540 that implement security measures for extended sessions. Client computing devices 502 include a plurality of client computing devices that interact with one or more web server system 512-514 monitored by the security server system 540.

The security server system 540 may include one or more defense server systems 532-534. A defense server system 532-534 is associated with one or more web server systems 512-514. The defense server system 532-534 performs actions relating to transactions and/or other interactions between individual client computing devices 502 and the associated web server system/s 512-514. Although FIG. 5 shows a one-to-one relationship between web server systems 512-514 and defense server systems 532-534, other configurations may be implemented. A defense server system 532 that is associated with a particular web server system 512 performs one or more actions during interactions between client computing devices 502 and the particular web server system 512.

A defense server system 532-534 may provide instrumentation code for execution at the client computing devices 502. In some embodiments, a defense server system 532-534 adds instrumentation code to, or otherwise integrates instrumentation code with web content served by the associated web server system 512-514 that can initiate a monitored interaction. For example, when a login request to a web server system 512-514 is a monitored interaction, the defense server system 532-534 may provide instrumentation code to web content from the web server system 512-514 that includes a login interface that a user can use to initiate a login request from the corresponding client computing device. The instrumentation code executes with the web content when the web content executes on the client computing device that requested the web content. In some embodiments, when the monitored interaction is initiated at a client computing device, the telemetry data is transmitted to the defense server system 532-534 associated with the corresponding web server system 512-514. For example, the telemetry data may be included with a request from the client computing device to the corresponding web server system 512-514. One or more defense server systems 532-534 may store UID data 536 for one or more associated web server systems 532-534.

Defense server systems 532-534 may be positioned in various network configurations with respect to the client computing devices 502 and their associated web server system 512-514. For example a defense server system 532-534 may be deployed in an in-line configuration, an out-of-band configuration, or another configuration that allows the defense server system 532-534 to perform actions relating to requests, transactions and/or other interactions as they occur between client computing devices 502 and one or more corresponding web server systems 512-514.

In an in-line configuration, a defense server system 532-534 may as a reverse proxy server to an associated web server system 512-514 by intercepting one or more communications between the client computing devices 502 and the associated web server system 512-514. As a reverse proxy server, the defense server system 532-534 retrieves resources, such as web content, on behalf of the clients of the associated web server systems 512-514. To the client computing devices 502, the resources appears to originate from the associated web server system 512-514.

The defense server system 532-534 may be deployed locally to the web server system 512-514 or deployed over the Internet with respect to the web server system 512-514, such as in a cloud computing system managed by a security company, and/or in a computer system operated by a security company. For example, the defense server system 532-534 may intercept messages to the client computing devices 502 and add instrumentation code for execution at the client computing devices 502. As another example, the defense server system 532-534 may intercept requests to the associated web server system 512-514 that include collected telemetry data from the client computing devices 502, process the telemetry data, and forward the requests to the associated web server system 512-514.

In an out-of-band configuration, a defense server system 532-534 may be involved in transactions and/or other interactions without intercepting communications between the client computing devices 502 and the associated web server system 512-514. For example, a web server system 512-514 may obtain instrumentation code from the corresponding defense server system 532-534, provide the instrumentation code to the client computing devices 502, receive telemetry data generated at the client computing devices 502, and/or provide the corresponding defense server system 532-534 the telemetry data received from the client computing devices 502. In response to a request from a web server system 512 or 514 regarding a particular client computing device with one or more device IDs, UIDs, telemetry and/or IDSDs, the security server system 540 may determine and respond with data indicating whether the client computing device appears to be a single-user device using one or more of the methods discussed herein.

Implementing Security Countermeasures

In some embodiments, the security server system 540 is operated by a security company or another entity that provides web security services. One or more web server systems 512-514 may be operated by security service customers, or entities that are provided security services by the security company. The security server system 540 protects the web server systems 512-514 of security service customers from attacks, such as attacks by malicious automated software executing on client computing devices 502.

In some embodiments, the defense server systems 532-534 analyze transactions and/or other interactions between the client computing devices 502 and the associated web server systems 512-514 to detect and mitigate attacks on the associated web server systems 512-514. For example, a defense server system 532-534 may collect and evaluate telemetry data corresponding to a transaction to determine whether the transaction is involved in an attack, such as whether a client computing device involved in the transaction is controlled by automated malicious software. The defense server systems 532-534 may analyze telemetry data for an interaction to prevent an attack in real time, such as by such as blocking, redirecting, or flagging communications that correspond to the interaction.

When analyzing telemetry data to provide security services, the defense server systems 532-534 may store the telemetry data in the telemetry database component 530. Telemetry data stored in the telemetry database component 530, including any telemetry data collected to implement security services, is available for implementing security measures for extended sessions as described herein. In some embodiments, one or more signals collected to provide security services (e.g. signal values 402-418) are used as identifying signals (e.g. signal values 402-408, identifying signal values 420) to implement security measures for extended sessions.

The security server system 540 may include a security analysis server system 538 that evaluates telemetry data collected at the client computing devices 502 to detect signatures or other properties of transactions initiated by malicious software executing on the client computing device/s 502. The security analysis server system 538 may use telemetry data collected for multiple web server systems 512-514 to learn about new attacks and/or to deploy new countermeasures for real-time attack detection and prevention. For example, the security analysis server system 538 may update individual defense server systems 532-534 with the new countermeasures so that the defense server systems 532-534 may use the new security countermeasures to process transactions between associated web server systems 512-514 and client computing device/s 502 in real time. The new countermeasures may include countermeasures that are usable to implement security measures for extended sessions and/or countermeasures that are usable to provide other security services.

Example Processes

Figure 6:
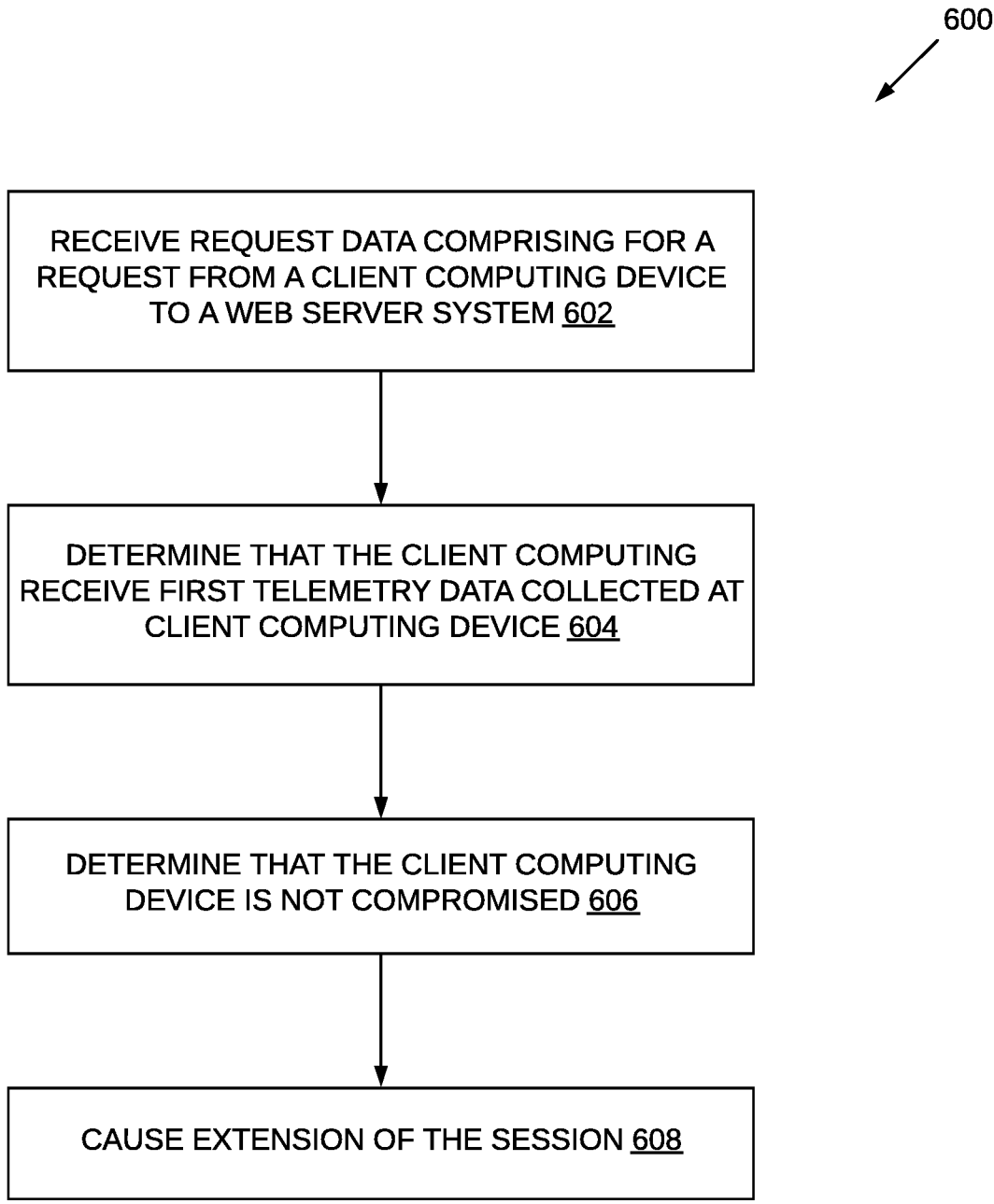
FIG. 6 is a flow diagram of a process for implementing security measures for extended sessions in an example embodiment.

FIG. 6 is a flow diagram of a process for implementing security measures for extended sessions in an example embodiment. Process 600 may be performed by one or more computing devices and/or processes thereof. For example, one or more blocks of process 600 may be performed by a computer system, such as but not limited to computer system 700. In some embodiments, one or more blocks of process 600 are performed by a security server system, which may include one or more defense server systems, companion server systems, and/or analysis server systems. Process 600 will be described with respect to security server system 140, but is not limited to performance by such.

At block 602, the security server system 140 receiving request data for a request from a client computing device to a web server system, the request comprising a session identifier (ID) for a session between an authenticated user and the web server system.

At block 604, the security server system 140 determines, based on the request data, that the client computing device is a single-user device. In some embodiments, the security server system 140 determines that the client computing device is a single-user device by determining that only the authenticated user has logged in to the web server system from the client computing device during a time period.

At block 606, the security server system 140 determines, based on the request data, that the client computing device is not compromised. In some embodiments, the security server system 140 determines that the client computing device is not compromised by determining that the client computing device is not controlled by automated software. In some embodiments, the security server system 140 determines that the client computing device is not compromised by providing instrumentation code that collects telemetry data at the client computing device when the instrumentation code is executed at the client computing device, receiving the telemetry data collected at the client computing device, and analyzing the telemetry data to determine whether the client computing device is compromised.

At block 608, in response to determining that the client computing device is a single-user device and that the client computing device is not compromised, the security server system 140 causes extension of the session between the authenticated user on the client computing device and the web server system. In some embodiments, the security server system 140 causes extension of the session by providing an indication to the web server system that the client computing device is a single-user device that is not compromised. The web server system may extend the session based on receiving the indication from the security server system 140. In some embodiments, extension of the session may include setting a new expiration date for an existing session cookie for the authenticated user at the client computing device, issuing a new session cookie for the authenticated user at the client computing device with a new expiration date, and/or otherwise extending the session.

Implementation Mechanisms—Hardware Overview

According to one embodiment, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field programmable gate arrays (FPGAs) that are persistently programmed to perform the techniques. Alternatively and/or in addition, the one or more special-purpose computing devices may include one or more general purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices and/or any other device that incorporates hard-wired or program logic to implement the techniques.

Figure 7:
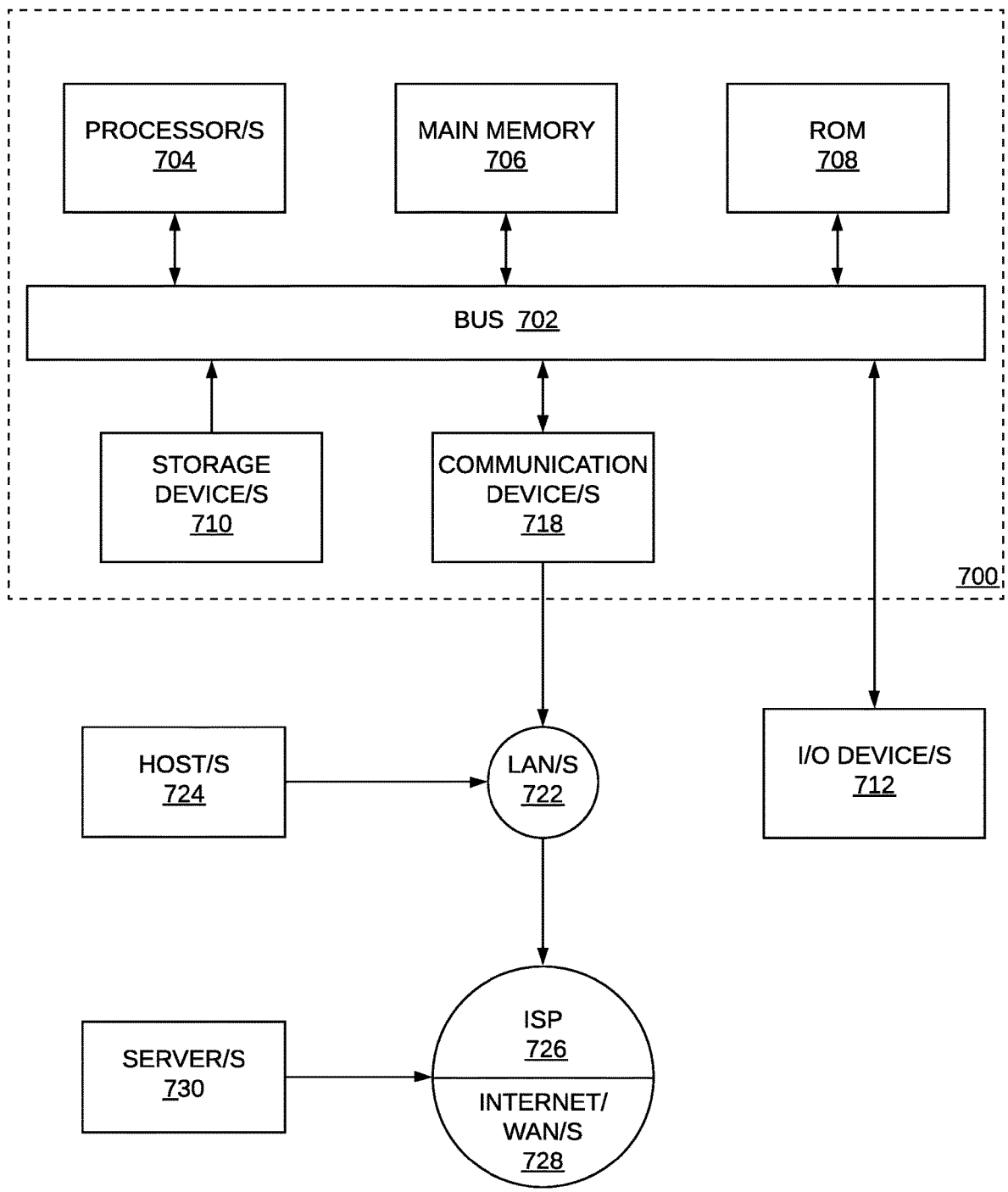
FIG. 7 illustrates a computer system upon which an embodiment may be implemented.

FIG. 7 illustrates a computer system upon which an embodiment may be implemented. Computer system 700 includes a bus 702 or other communication mechanism for communicating information, and one or more hardware processors 704 coupled with bus 702 for processing information, such as basic computer instructions and data. Hardware processor/s 704 may include, for example, one or more general-purpose microprocessors, graphical processing units (GPUs), coprocessors, central processing units (CPUs), and/or other hardware processing units.

Computer system 700 also includes one or more units of main memory 706 coupled to bus 702, such as random access memory (RAM) or other dynamic storage, for storing information and instructions to be executed by processor/s 704. Main memory 706 may also be used for storing temporary variables or other intermediate information during execution of instructions to be executed by processor/s 704. Such instructions, when stored in non-transitory storage media accessible to processor/s 704, turn computer system 700 into a special-purpose machine that is customized to perform the operations specified in the instructions. In some embodiments, main memory 706 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

Computer system 700 may further include one or more units of read-only memory (ROM) 708 or other static storage coupled to bus 702 for storing information and instructions for processor/s 704 that are either always static or static in normal operation but reprogrammable. For example, ROM 708 may store firmware for computer system 700. ROM 708 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 710, such as a magnetic disk or optical disk, is provided and coupled to bus 702 for storing information and/or instructions. Storage device/s 710 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid state drives, flash memory, optical disks, one or more forms of non-volatile random access-memory (NVRAM), and/or other non-volatile storage media.

Computer system 700 may be coupled via bus 702 to one or more input/output (I/O) devices 712. For example, I/O device/s 712 may include one or more displays for displaying information to a computer user, such as a cathode ray tube (CRT) display, a Liquid Crystal Display (LCD) display, a Light-Emitting Diode (LED) display, a projector, and/or any other type of display.

I/O device/s 712 may also include one or more input devices, such as an alphanumeric keyboard and/or any other key pad device. The one or more input devices may also include one or more cursor control devices, such as a mouse, a trackball, a touch input device, or cursor direction keys for communicating direction information and command selections to processor 704 and for controlling cursor movement on another I/O device (e.g. a display). This input device typically has at degrees of freedom in two or more axes, (e.g. a first axis x, a second axis y, and optionally one or more additional axes z . . . ), that allows the device to specify positions in a plane. In some embodiments, the one or more I/O device/s 712 may include a device with combined I/O functionality, such as a touch-enabled display.

Other I/O device/s 712 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with processor/s 704 over bus 702.

Computer system 700 may implement the techniques described herein using customized hard-wired logic, one or more ASICs or FPGAs, firmware or program logic which, in combination with the computer system causes or programs, causes computer system 700 to be a special-purpose machine. According to one embodiment, the techniques herein are performed by computer system 700 in response to processor/s 704 executing one or more sequences of one or more instructions contained in main memory 706. Such instructions may be read into main memory 706 from another storage medium, such as one or more storage device/s 710. Execution of the sequences of instructions contained in main memory 706 causes processor/s 704 to perform the process steps described herein. In alternative embodiments, hard-wired circuitry may be used in place of or in combination with software instructions.

Computer system 700 also includes one or more communication interfaces 718 coupled to bus 702. Communication interface/s 718 provide two-way data communication over one or more physical or wireless network links 720 that are connected to a local network 722 and/or a wide area network (WAN), such as the Internet. For example, communication interface/s 718 may include an integrated services digital network (ISDN) card, cable modem, satellite modem, or a modem to provide a data communication connection to a corresponding type of telephone line. Alternatively and/or in addition, communication interface/s 718 may include one or more of: a local area network (LAN) device that provides a data communication connection to a compatible local network 722; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network access a wide area network (WAN, such as the Internet 728); and other networking devices that establish a communication channel between computer system 700 and one or more LANs 722 and/or WANs.

Network link/s 720 typically provides data communication through one or more networks to other data devices. For example, network link/s 720 may provide a connection through one or more local area networks 722 (LANs) to one or more host computers 724 or to data equipment operated by an Internet Service Provider (ISP) 726. ISP 726 in turn provides connectivity to one or more wide area networks 728, such as the Internet. LAN/s 722 and WAN/s 728 both use electrical, electromagnetic or optical signals that carry digital data streams. The signals through the various networks and the signals on network link/s 720 and through communication interface/s 718 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its main memory 706 and send the instructions over a telecommunications line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 can send messages and receive data, including program code, through the network(s), network link 720 and communication interface 718. In the Internet example, one or more servers 730 might transmit signals corresponding to data or instructions requested for an application program executed by the computer system 700 through the Internet 728, ISP 726, local network 722 and a communication interface 718. The received signals may include instructions and/or information for execution and/or processing by processor/s 704. Processor/s 704 may execute and/or process the instructions and/or information upon receiving the signals by accessing main memory 706, or at a later time by storing them and then accessing them from storage device/s 710.

Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
one or more hardware processors;
at least one memory coupled to the one or more hardware processors and storing one or more instructions which, when executed by the one or more hardware processors, cause the one or more hardware processors to:
receive request data for a request from a client to a web server system, the request comprising a session identifier (ID) for a session between an authenticated user and the web server system;
determine, based on the request data, that the client is a single-user device based on determining that only the authenticated user has logged in to the web server system from the client during a time period;
determine, based on the request data, that the client is not compromised based on an analysis of request data comprising telemetry data received from the client generated by one of a plurality of types of instrumentation code provided to the client based on a type of risk posed by the client;
in response to determining that the client is a single-user device and that the client is not compromised, cause extension of the session between the authenticated user on the client and the web server system by setting a new expiration date for an existing session cookie for the authenticated user at the client or issuing a new session cookie for the authenticated user at the client with a new expiration date.

2. The computer system of claim 1, wherein the determine that the client is not compromised further comprises at least one additional instruction to determine that the client is not controlled by automated software.

3. The computer system of claim 1, wherein the one or more instructions, when executed by the one or more hardware processors, cause the one or more hardware processors to:
issue a cookie to the client comprising a device ID, wherein the request data includes the cookie;
store, in association with the device ID, user ID data for any authenticated users that successfully log in to web server system from the client;
wherein the determine that the client is a single-user device further comprises at least one additional instruction to use the device ID in the request data to look up the user ID data associated with the web server system.

4. The computer system of claim 1, wherein the one or more instructions, when executed by the one or more hardware processors, cause the one or more hardware processors to:
issue a cookie to the client comprising encrypted user ID data for each authenticated user that successfully logs in to the web server system from the client computing device, wherein the request data includes the cookie;
wherein the determine that the client is a single-user device further comprises at least one additional instruction to analyze the encrypted user ID data.

5. A method implemented by a network management system comprising one or more security server devices, web server systems, or client computing devices, the method comprising:
receiving request data for a request from a client to a web server system, the request comprising a session identifier (ID) for a session between an authenticated user and the web server system;
determining, based on the request data, that the client is a single-user device based on determining that only the authenticated user has logged in to the web server system from the client during a time period;

determining, based on the request data, that the client is not compromised based on an analysis of request data comprising telemetry data received from the client generated by one of a plurality of types of instrumentation code provided to the client based on a type of risk posed by the client;

in response to the determining that the client is a single-user device and that the client is not compromised, causing extension of the session between the authenticated user on the client and the web server system by setting a new expiration date for an existing session cookie for the authenticated user at the client or issuing a new session cookie for the authenticated user at the client with a new expiration date.

6. The method of claim 5, wherein the determining that the client is not compromised further comprises determining that the client is not controlled by automated software.

7. The method of claim 5, further comprising:
issuing a cookie to the client comprising a device ID, wherein the request data includes the cookie;
storing, in association with the device ID, user ID data for any authenticated users that successfully log in to web server system from the client;
wherein the determining that the client is a single-user device comprises using the device ID in the request data to look up the user ID data associated with the web server system.

8. The method of claim 5, further comprising:
issuing a cookie to the client comprising encrypted user ID data for each authenticated user that successfully logs in to the web server system from the client, wherein the request data includes the cookie;
wherein the determining that the client is a single-user device further comprises analyzing the encrypted user ID data.

9. A non-transitory computer readable medium having stored thereon instructions comprising executable code which when executed by one or more processors, causes the processors to:
receive request data for a request from a client to a web server system, the request comprising a session identifier (ID) for a session between an authenticated user and the web server system;
determine, based on the request data, that the client is a single-user device based on determining that only the authenticated user has logged in to the web server system from the client during a time period;
determine, based on the request data, that the client is not compromised based on an analysis of request data comprising telemetry data received from the client generated by one of a plurality of types of instrumentation code provided to the client based on a type of risk posed by the client;
in response to determining that the client is a single-user device and that the client is not compromised, cause extension of the session between the authenticated user on the client and the web server system by setting a new expiration date for an existing session cookie for the authenticated user at the client or issuing a new session cookie for the authenticated user at the client with a new expiration date.

10. The non-transitory computer readable medium of claim 9, wherein the determine that the client is not compromised further comprises at least one additional instruction to determine that the client is not controlled by automated software.

11. The non-transitory computer readable medium of claim 9, wherein the executable code when executed by the one or more processors further causes the one or more processors to:
issue a cookie to the client comprising a device ID, wherein the request data includes the cookie;
store, in association with the device ID, user ID data for any authenticated users that successfully log in to web server system from the client;
wherein the determine that the client is a single-user device further comprises at least one additional instruction to use the device ID in the request data to look up the user ID data associated with the web server system.

12. The non-transitory computer readable medium of claim 9, wherein the executable code when executed by the one or more processors further causes the one or more processors to:
issue a cookie to the client comprising encrypted user ID data for each authenticated user that successfully logs in to the web server system from the client computing device, wherein the request data includes the cookie;
wherein the determine that the client is a single-user device further comprises at least one additional instruction to analyze the encrypted user ID data.

13. A network management system comprising one or more security server devices, web server systems, or client computing devices, the network management system comprising memory comprising programmed instructions stored thereon and one or more processors configured to be capable of executing the stored programmed instructions to:
receive request data for a request from a client to a web server system, the request comprising a session identifier (ID) for a session between an authenticated user and the web server system;
determine, based on the request data, that the client is a single-user device based on determining that only the authenticated user has logged in to the web server system from the client during a time period;
determine, based on the request data, that the client is not compromised based on an analysis of request data comprising telemetry data received from the client generated by one of a plurality of types of instrumentation code provided to the client based on a type of risk posed by the client;
in response to determining that the client is a single-user device and that the client is not compromised, cause extension of the session between the authenticated user on the client and the web server system by setting a new expiration date for an existing session cookie for the authenticated user at the client or issuing a new session cookie for the authenticated user at the client with a new expiration date.

14. The system of claim 13, wherein the determine that the client is not compromised further comprises at least one additional instruction to determine that the client is not controlled by automated software.

15. The system of claim 13, wherein the one or more processors are further configured to be capable of executing the stored programmed instructions to:
issue a cookie to the client comprising a device ID, wherein the request data includes the cookie;
store, in association with the device ID, user ID data for any authenticated users that successfully log in to web server system from the client;

wherein the determine that the client is a single-user device further comprises at least one additional instruction to use the device ID in the request data to look up the user ID data associated with the web server system.

16. The system of claim 13, wherein the one or more processors are further configured to be capable of executing the stored programmed instructions to:

issue a cookie to the client comprising encrypted user ID data for each authenticated user that successfully logs in to the web server system from the client computing device, wherein the request data includes the cookie;

wherein the determine that the client is a single-user device further comprises at least one additional instruction to analyze the encrypted user ID data.

* * * * *